March 8, 1938.  J. L. TAYLOR  2,110,343
STATIC BALANCING MACHINE
Filed Nov. 12, 1934  2 Sheets-Sheet 1
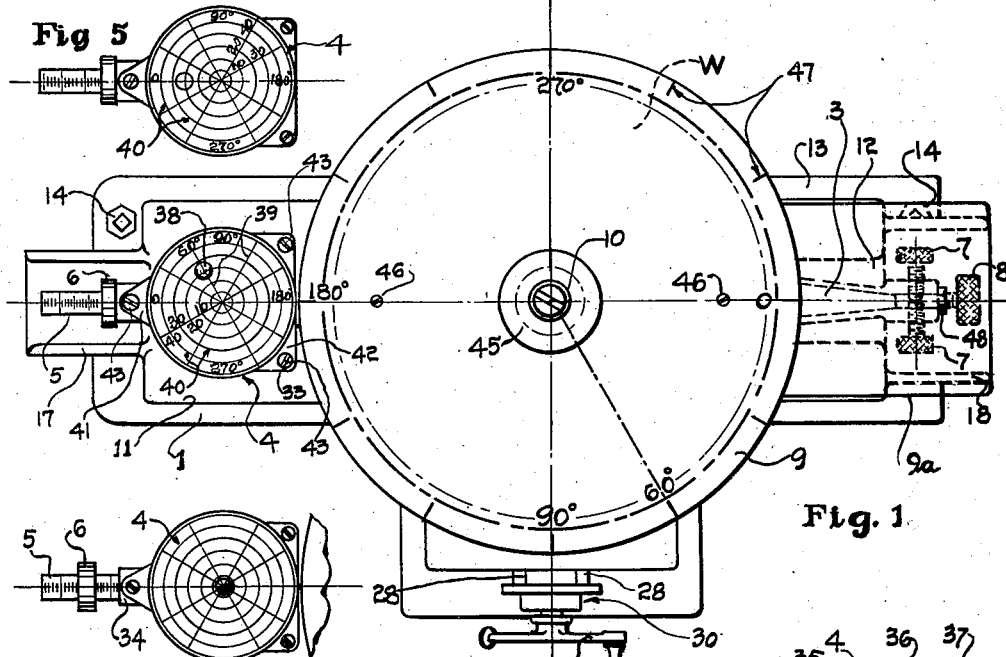
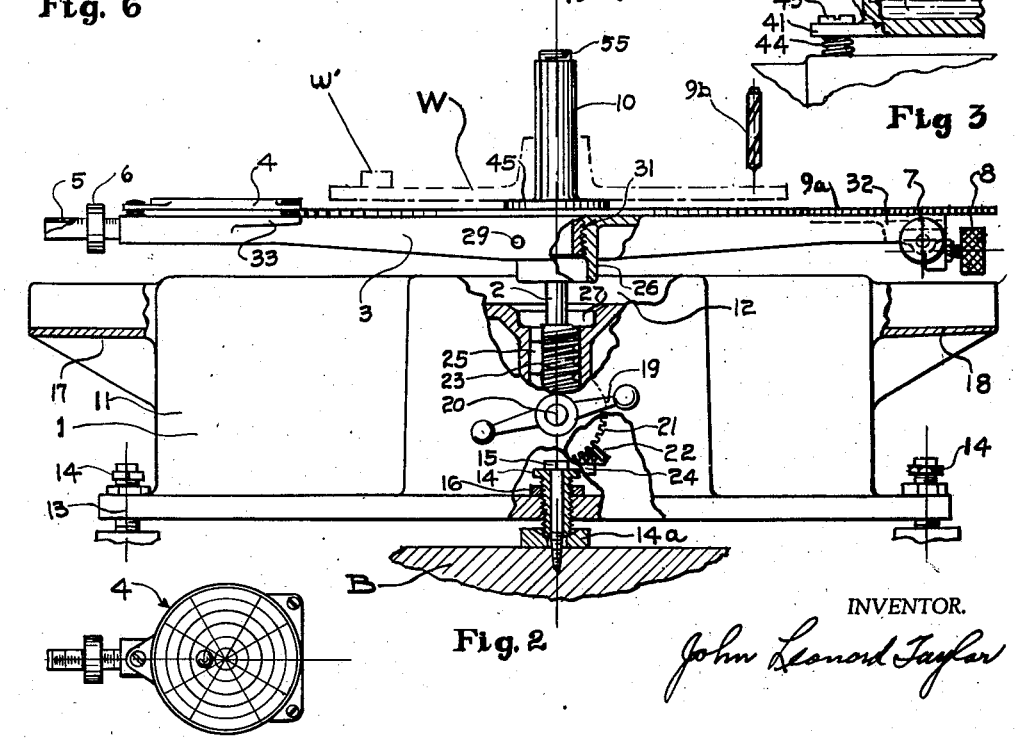
INVENTOR.
John Leonard Taylor March 8, 1938.  J. L. TAYLOR  2,110,343

STATIC BALANCING MACHINE

Filed Nov. 12, 1934    2 Sheets-Sheet 2

INVENTOR.
John Leonard Taylor

Patented Mar. 8, 1938

2,110,343

UNITED STATES PATENT OFFICE 2,110,343

STATIC BALANCING MACHINE

John Leonard Taylor, Milwaukee, Wis.; Grace Brindley Taylor, executrix of said John Leonard Taylor, deceased Application November 12, 1934, Serial No. 752,587

12 Claims. (Cl. 73—51)

The present invention relates to static balancing machines, and an object of the invention is to generally improve the construction and operation of machines of this class.

A further object is to provide such a machine in which the angular location as well as the moment of the unbalanced weight in a work piece may be read directly.

Further objects are to provide various improvements in the general structure of such devices including a construction of beam for a balancing machine which will not become unbalanced due to changes in dimensions thereof caused by changes in temperature, an improved construction of spindle and mounting for a pivot or fulcrum ball therein, a universal level construction having capacity for indicating relatively large deviations while giving extremely accurate indications of slight deviations from level, a mounting for such a level of a type permitting adjustment thereof relatively to the beam, means for readily setting up and checking the accuracy of leveling of the whole machine by means of the level already mounted thereon, and other features of construction and operation which will appear from the following specification and annexed drawings in which:

Fig. 1 is a plan view of a balancing machine constructed according to this invention.

Fig. 2 is a front elevation of the same with parts broken away.

Fig. 3 is an enlarged vertical sectional view of structure indicated in Fig. 2.

Figs. 5, 6, and 7 are plan views of structure shown in Fig. 1, showing parts in various positions and the use of a checking weight.

Figure 4:
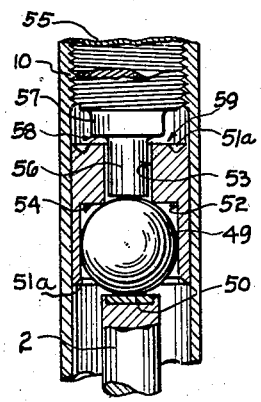
Fig. 4 is an enlarged vertical sectional view of the fulcrum structure.
Figure 8:
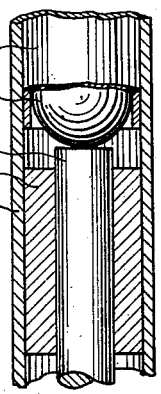

Fig. 8 is a view similar to Fig. 4 showing the use of a bushing for setting up and checking purpose.

Figure 9:
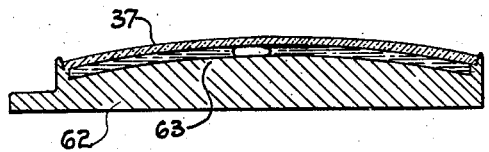

Fig. 9 is a vertical sectional view of a modified type of level, shown enlarged.

Figure 10:
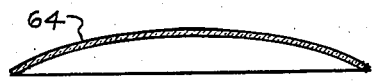

Fig. 10 is a vertical sectional view of an alternative form of glass for a level.

Figure 11:
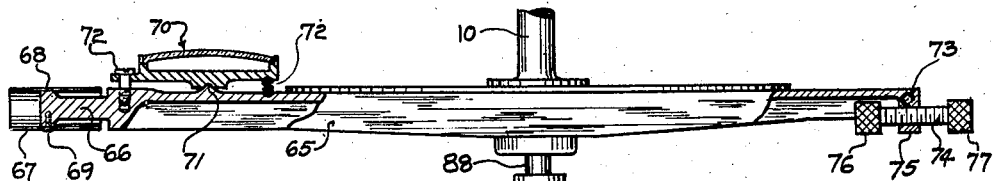

Fig. 11 is a fragmentary view of a type of beam for a balancing machine which will avoid inaccuracies due to temperature changes, the figure including a diagrammatic showing of a hydraulic column raising means.

Figure 12:
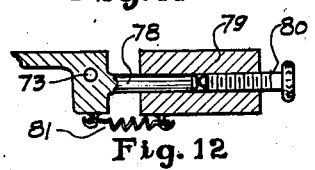

Fig. 12 is a vertical sectional view of a modified form of adjusting weight for such a beam.

Figure 13:
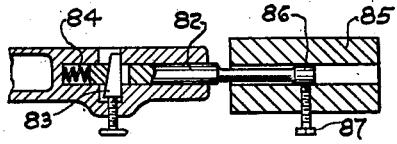

Fig. 13 is a vertical sectional view of a further modified form of adjusting weight.

Figure 14:
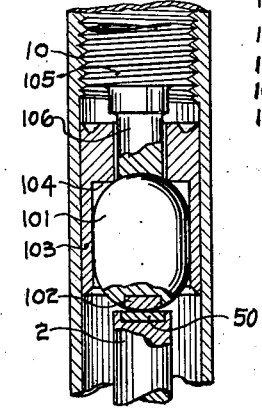

Fig. 14 is a view similar to Fig. 4 showing a modified form of fulcrum structure.

Figure 15:
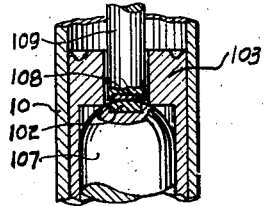

Fig. 15 is a similar fragmentary view of a modified structure applicable to the structure of Fig. 14.

Figure 16:
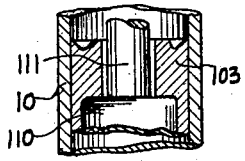

Fig. 16 is a similar view of a further modification.

As seen in Fig. 1, the machine illustrative of the present invention comprises a base 1, arranged for mounting on a suitable support such as a bench B, a portion of which is shown in Fig. 2, and supporting therein a substantially vertically movable column or support 2, Fig. 2, the column carrying a beam or support 3 pivotally mounted thereon for universal tilting movement. Beam 3 has fixed therewith a level 4 for indicating such tilting movement, a scale beam or extension 5 upon which may be mounted a weight 6 for certain checking purposes, a plurality of balancing or adjusting screws 7—7, and 8, and a plotting dial or pan 9. The beam 3 engages column 2 through an upstanding hollow spindle 10 provided interiorly with pivot mechanism of the nature disclosed in my co-pending application Serial No. 645,675, filed December 5, 1932, an improved form of which is disclosed below.

Base 1 includes a box-like body portion 11 of generally T-shaped contour as seen in plan in Fig. 1, providing a channel 12 in its upper surface into which beam 3 may be retracted when column 2 is lowered. It has a relatively wide lower rim 13 in which are threaded adjustable supports of the type disclosed in my co-pending application Serial No. 687,096 filed August 28, 1933, patented May 18, 1937, No. 2,080,939 each preferably comprising a bushing 14, threadedly adjustable up and down in a suitable bore in the flange. The lower end of the bushing is made spherical and contacts a cooperating washer 14a resting on the support B and supporting the base 1 thereon. These bushings are placed preferably at three widely separated points about the base 1, and by adjusting them up or down the base may be quickly and accurately leveled regardless of the condition of level of the support B. Each bushing is preferably traversed by a bolt 15 or the like engaged with the bench to hold base 1 firmly thereon, and the bushing is preferably made to fit snugly in the bore in flange 13 to prevent relative motion of the bushing and base, although a lock-nut 16 may be used for this purpose if desired. The base also provides trough-like guards 17 and 18 extending from the extremities of channel 12 to shield projecting portions of beam 3 from accidental blows or the like.

Suitable mechanism is provided in base 1 for raising and lowering column 2 the mechanism being of any desired type, but for the purpose of illustration of the type disclosed in the above mentioned Patent No. 2,080,939, having a crank 19 fixed with a shaft 20 journaled in portion 11, the shaft having a gear 21 fixed therewith meshing with a gear 22 having a threaded hub portion engaged with a threaded portion 23 of column 2 and resting on a thrust bearing 24 carried by base 1, a key 25 slidably engaging a slot or key-way in the threaded portion to prevent rotation thereof whereby rotation of crank 19 will, through gears 21 and 22, cause rising or falling of column 2, this movement lifting beam 3 into balancing position or lowering it into position such that a centering or hub portion 26 fits into a socket 27 thereby relieving the pivot within spindle 10 of load and accurately centering the spindle relatively to column 2.

Suitable mechanism may be provided if desired for holding the beam firmly in this position to prevent displacement thereof while a work piece W is being placed thereon or removed therefrom. In the present instance mechanism is used similar to that disclosed in the above mentioned Patent No. 2,080,939, having plungers 28—28 arranged to be forced into sockets 29—29, upon extreme downward movement of column 2, by suitable cam mechanism carried on shaft 20 and generally designated by numeral 30. Since this mechanism forms no part of the present invention, and is amply described and illustrated in the above mentioned case, further disclosure of it is not made herein.

Beam 3 in the present instance is preferably made of light material, and preferably in inverted channel form, although any desired form or material is contemplated as in accordance with the invention. Spindle 10 is fixed with beam 3 in any suitable manner such for example as threading as shown at 31. At one end the beam provides a boss 32 having suitable bores for the reception of the screws 7 and 8, and near its other end a pair of pads 33—33 extending laterally from the beam for supporting level 4; a boss portion 34 serving also to support the level and as an anchorage for extension 5.

Extension 5 may be formed and attached to beam 3 in any suitable manner, but is preferably tubular as suggested in Fig. 2, and may conveniently be pressed into a suitable bore in boss 34, although other well known means of attaching the extension are contemplated as equivalent.

Level 4, as more particularly shown in Fig. 3 comprises a base or shell portion 35 providing an upwardly directed recess 36 closed by a more or less upwardly convex glass or other transparent member 37, the space under the glass being completely filled with suitable liquid except for a small void or bubble 38 which seeks the highest point under the glass, and by its position indicates the state of inclination or lack thereof in shell 35. To permit the apparatus to indicate more than merely that the beam is or is not level, angular lines 39 are formed intersecting at the center of the glass, the lines being indexed with their various angles in degrees, so that comparison of the position of the bubble 38 with one or more of the lines will indicate the direction in which the tilting movement has taken place. Other lines 40 are also formed in the form of circles concentric with the center of the glass, and these may be indexed in any desired values, comparison of the bubble position with one or more of these indicating the amount of tilting causing the displacement or any other factor which may be proportional to the tilting.

These lines are preferably etched on the under side of glass 37, together with their indexes and suitably colored, but it is contemplated that they may be formed on the upper side of the glass, or on the bottom of the recess 36, or in a variety of other ways known to the makers of such instruments without departing from the present invention.

Level 4 is mounted on beam 3 in any suitable manner, but preferably so that the relation between it and the beam may be adjusted. For this purpose ears 41—42 are provided projecting laterally from shell 35 in position to cover respectively boss 34 and pads 33—33 when the level is in position on the beam. Screws 43—43 extend downwardly through the ears and into the boss and pads as particularly shown in Figs. 2 and 3, the screws in the present instance being surrounded by springs 44—44 which resiliently support the level at three points, the position of the ears and accordingly of the level being determined by the adjustment of the screws. By manipulating the latter, any desired tilting adjustment of the level relatively to the beam may be accomplished.

Dial 9 is preferably a disk of light sheet metal, although other materials and forms are contemplated, and it is conveniently fixed on the beam 3 by being clamped under a flange 45 extended from spindle 10, the disk being positively prevented from rotating relatively to beam 3 by screws or the like 46. Near its periphery it is provided with graduations 47 which in the present instance are indexed in degrees, values corresponding to those on level 4 being found opposite from those on the level, as referred respectively to the center of glass 37 and spindle 10. When an unbalanced work piece W is placed upon spindle 10 it will cause tilting thereof in such a direction that the heaviest portion of the work piece is depressed. Since the bubble in level 4 seeks the highest point in the instrument, it will go in a direction relatively to the center of the glass opposite to the direction of the heavy spot from the center of spindle 10. Then since the graduations on the level and on the dial are opposite, the angle of deflection indicated by the bubble will indicate, when read on the graduations on dial 9, the true angular position of the heavy spot in the work piece. The level will also be graduated to indicate units of weight according to the radial movement of the bubble. The dial 9 and a projection cover 9ᵃ shield beam 3 and channel 12 from material removed by a tool 9ᵇ in correcting unbalance in a work piece W.

Screws 7—7 are preferably threaded into opposite ends of a bore formed transversely in boss 32, and abut within the bore as shown in Fig. 1, each screw acting as a locking means for the other and preventing accidental displacement of either screw. Screw 8 is threaded in a bore formed axially of beam 3 and above or below the bore for screws 7—7 to avoid interference between the several screws except as outlined above. A lock nut 48 or other suitable well known means may be provided to prevent accidental displacement of screw 8.

Reference to Figs. 1 or 2 will show that the length of beam 3 between spindle 10 and the region of screws 7 and 8 is approximately equal to the length of the beam between the spindle and the point of attachment of extension 5. Changes in the length of the beam caused by changes in temperature will therefore be substantially equal on opposite sides of the spindle so that the moments of the weight of the beam and its attached parts on one side of the spindle will remain substantially equal to the moments of the weight of the beam on the other side of the spindle. The beam will therefore remain in substantially perfect balance throughout a wide range of different temperatures. Under extreme conditions, or where exceptional accuracy is required a modified construction may be employed which will be described below.

Spindle 10 is hollow as above stated, and as more particularly shown in Fig. 4 is arranged to accommodate a pivot ball or fulcrum 49 which supports the spindle and beam 3 on column 2, an insert or the like 50 of relatively hard or otherwise suitable bearing material for extreme pressures being fixed with or in the top of the column if desired. Ball 49 in the present instance is guided in a bushing 51 which has a snug sliding fit within spindle 10, and provides a bore 52 of a size to give a snug sliding fit about the periphery of ball 49. Dust wipers 51a of suitable or well-known type may be provided at either end of the bushing if desired to contact the interior of spindle 10 and remove foreign material which might damage the surfaces. A smaller bore 53 extends from bore 52 through the remainder of the bushing, forming a shoulder 54 at the point of juncture between the two bores which limits movement of the ball relatively to the bushing in one direction. A plunger 55 is axially disposed in spindle 10 and may be threaded therein or otherwise axially adjustable. The plunger has a finger 56 extending therefrom through bore 53 into engagement with ball 49, and a portion 57 having a shoulder 58 spaced slightly from the end surface 59 of bushing 51 when both finger 56 and shoulder 54 are in contact with ball 49. Thus upon downward movement of plunger 55, while the weight of the beam and its load is transmitted directly through finger 56 and ball 49 to column 2, movement of bushing 51 is assured by contact thereof with shoulder 58. On the contrary if it is desired to raise plunger 55, contact thereof with ball 49 may be assured by bearing down on the spindle, ball 49, engaging shoulder 54 in bushing 51 operating to slide the bushing in the spindle until further movement of the ball is prevented by contact thereof with finger 56. In some instances the weight of the work piece may be sufficient to do this, but if not the beam may be forced down by hand or otherwise.

In practice bushing 51 and plunger 55 are made with the utmost possible accuracy so that spindle 10, bushing 51, ball 49, finger 56, plunger 55 and portion 57 are as near truly concentric with each other as it is possible to make them.. This is desirable since any shifting of the point of contact of ball 49 with column 2 relatively to the center of spindle 10 will lead to an error in the moment as indicated on level 4.

With the apparatus so far described beam 3 having been previously balanced, column 2 is lowered by manipulation of crank 19 until portion 26 rests in socket 27, beam 3 being maintained in this position by pins 28—28. A work piece W is then placed on the spindle 10, any forces resulting from this operation being taken directly by the base through boss 26, column 2 being moved downwardly out of contact with ball 49. At the same time spindle 10 is positioned substantially concentrically about column 2 so that the space thereabout for tilting of the beam is substantially uniform in all directions. By opposite manipulation of crank 19, pins 28—28 are then withdrawn and column 2 moved into contact with ball 49, and enough further to raise beam 3 and boss 26 clear of the base and socket 27. If the work piece is out of balance, tilting of the beam will take place, and bubble 38 will move and come to rest at some point away from the center of the glass as suggested in Fig. 1. This would indicate, taking the reading shown in the figure for example, that the excessive weight in the piece is centered on a line 60, 60 degrees from the zero on dial 9, and extending to the center of spindle 10, and that its moment is 30 ounce inches. If the machine has been correctly set up for this type of work piece this value will be correct and the removal of an amount by weight of material somewhere on line 60 at a distance from spindle 10 to develop a moment equal to 30 ounce inches will put the work piece in correct balance without further operation. If desired the piece may be balanced equally well by adding this amount of weight to the opposite side, or on a line from spindle 10 to the 240 degree graduation on dial 9. Column 2 is lowered and pins 28 operate to prevent movement or damage to ball 49 or the like when the tested work piece is being removed, and if desired the act of removing the material may be done before the piece is removed, the pivot being relieved from all shock or vibration from the cutting tools by the positioning of the column out of contact therewith.

Pieces of different weight, or thickness or other characteristics, however, will cause different amounts of tilting on such a machine as this when out of balance by equal amounts, and means is provided for setting up the machine to avoid the error which would otherwise appear in the reading of the level 4 from this source. This is accomplished by changing the relation between the center of gravity of the beam and its load relatively to the point of contact between column 2 and ball 49 by means of plunger 55. Above mentioned weight 6 may be used to actually measure the moment of the unbalanced weight, and this reading used to check the reading of the level.

Assuming again that the beam itself has been previously properly balanced, that a work piece such as W has not been balanced before and the correct adjustment of the plunger 55 is therefore not known, the reading of the level indicates the center of the unbalanced weight to be on the 60 degree line as before. The moment indication is disregarded and the work piece turned so that the center of the unbalanced weight is on a line from spindle 10 to the zero on dial 9. Upon again testing, the bubble would indicate the unbalance as centered on the zero line, and of the same value as before, as seen in Fig. 5. A weight 6 on extension 5 is moved until the tilting of the beam and its load is overcome as indicated by the returning of the bubble to the center of glass 37. From the known value of weight 6 and the reading of extension or scale 5 the moment of the unbalanced weight is determined, the moment being equal to the product of the weight and the distance of its application from the fulcrum or spindle 10. This determination is not affected materially by the adjustment of plunger 55, since the reading is taken when the beam is exactly balanced by the weight and the value determined from the position of the weight and not the bubble. Assuming the distance from the center of spindle 10 to the center of weight 6 when the weight is against boss 34 to be 10 inches, and the value of the weight to be one ounce, the position of the weight indicated in Fig. 6 would show a moment of 11 ounce inches as necessary to exactly balance the beam and its load, this also being the amount which the work piece is out of balance. This then is the indication which the level should have given before the weight was adjusted on extension 5. The beam accordingly tilted too far previously, indicating that the plunger 55 and ball 49 are too far down in spindle 10. The weight is then rested on the base and the plunger and ball are accordingly adjusted upwardly until the reading of the level corresponds with the amount as determined by the weight 6 as seen in Fig. 7, when the machine is ready for a run of work pieces of the type of W.

Obviously the top surface of column 2 must be exactly level to insure the accuracy of the readings of level 4, and to check this from time to time a bushing 61 is provided (Fig. 8) which may be temporarily interposed between column 2 and spindle 10, the bushing having a close running fit both about the column 2 and within the spindle 10. This positively prevents tilting of the beam relatively to the column, and when it is in place, assuming the level to be correctly adjusted on beam 3, the level indicates the position of the column, and not merely that of the beam, and correction may be made by means of bushings 14 on the base 1 in the event that any inaccuracy is found. If it is suspected that the level is not accurately adjusted on the beam a slightly different procedure is adopted as follows.

With bushing 61 in place column 2 is raised sufficiently so that beam 3 can be swung around the column into any desired position. The bushings 14 are then adjusted until level 4 indicates that the beam is level. The beam is then rotated as above suggested and if any deviation occurs the position is found where it is greatest as indicated by level 4. With the beam in this position one-half of this deviation is corrected by adjusting the bushings 14, and the other half by adjusting the screws 43, after which the level will be found to indicate no deviation in any position of beam 3, showing that the column is plumb, and the level is properly adjusted on the beam.

The stability of the level position for a given work piece may be checked by placing such a work piece on the machine, the weight thereof taking up all slack, or other slight inaccuracy of the several parts composing the elevating mechanism. The work piece W is placed in balancing position and a weight $w'$, Fig. 2, is placed on the work piece and adjusted to a position to counteract any unbalance in the piece indicated by tilting thereof. The work piece is then rotated about spindle 10 to observe if at any position unbalance is indicated. If any tilting occurs under these conditions, it indicates that either the column or the base or some other part of the structure has shifted slightly under the additional weight of the work piece, and, while this condition would not normally be tolerated, it is possible to use the machine with accurate results, even under these conditions. This is done by selecting the position of the work piece indicating the greatest deviation on level 4, and correcting one half of this deviation by adjusting the bushings 14, and the other half by adjusting the weight $w'$. The work piece will then be correctly balanced with weight $w'$ in place, and the machine will be set up to accurately test other work-pieces of the character of W. Rotating the work piece W about spindle 10 after these adjustments will not cause a deviation of level 4.

For most purposes the glass 37 preferably has an arcuate cross section as shown in Fig. 9, and if desired a modified shell portion 62 may have a portion 63 approaching closely to the glass whereby the bubble may extend entirely across the space remaining, and the increased currents of liquid around the bubble caused by the restricted space in which it moves may retard the movement of the bubble sufficiently to prevent repeated oscillations thereof after the beam comes to rest. This construction would also permit the graduations indicating angles, moments etc. to be formed on the surface of portion 63 and read without likelihood of error through the glass and liquid.

If desired a special curve may be adopted for the glass as shown in Fig. 10, in which a glass 64 is characterized by a relatively slight curvature in the region near the center with increasing curvature as the edges are approached. The graduations representing moments are spaced in accordance with the changing curvature. Such a level would be characterized by extreme accuracy in indicating slight deviations from level while having the capacity to indicate relatively large deviations without disadvantages other than the sacrifice of a certain degree of accuracy at such large deviations.

Fig. 11 shows a beam construction above referred to for use under extreme conditions of temperature or where especially accurate work is required. It is understood that a beam of homogeneous material, but non-uniform cross section, if originally balanced on a fulcrum, in general will remain in balance in spite of expansion caused by change in temperature, but that if the beam is composed of a plurality of materials of different coefficients of expansion, it is likely to go out of balance upon expansion owing to the different amount of change of the various parts. The expansion on the opposite sides of the fulcrum under these conditions is unequal unless the two halves of the beam are identical. It would be inconvenient to make the halves of beam 3 identical, and to avoid the necessity of this the construction of Fig. 11 has been devised.

In this arrangement a beam 65 is provided somewhat similar to beam 3, but having a finger 66 integral with or of the same material as beam 65 extending within a scale or extension 67 which corresponds to extension 5 of Fig. 1, the finger having a head portion 68 located substantially at the plane of the longitudinal center of gravity of extension 67, and fixed therewith by a screw 69 or the like. The center of gravity of the extension will therefore be moved by expansion of the beam the same amount from spindle 10 as it would have if the extension were an integral part of the beam or of the same material as the beam, and since its weight does not change with expansion, the assembly acts as would a beam of homogeneous material but non-uniform cross section.

The same principle is used in the mounting of a level 70 which is pivoted on a boss of spherical or other suitable form 71, or otherwise pivoted to beam 65 at a point substantially on the vertical axis of the level. Screws 72—72 may be used to maintain the level in place on the beam arranged similarly to above mentioned screws 43, the level tilting about pivot 71 when adjustments are made. Again the weight of the level is applied to the beam at a point determined by the expansion of the beam and not by the expansion of the level, and the beam will behave under expansion as if made of homogeneous material. Suitable clearance is provided about screws 43 to permit the boss and not the screws to determine the position of the level.

Advantage may be taken of this principle to avoid making the arm of beam 65 extending to the right of spindle 10, as seen in Fig. 11 of equal length to the arm extending to the left. This may be accomplished by making the cross section of the right portion of the beam enough heavier to balance or at least partially balance the weight of the longer arm to the left including the level and extension 67. Screws 7—7 are carried in bores such as 73 in the same manner as in the case of beam 3, the effective center of gravity of the pair of screws being substantially on the axis of beam 65, but in place of adjusting screw 8 a special double screw 74 is provided threaded through boss 75 and having two heads 76 and 77 of identical weight and dimensions, one of the heads being applied to the screw after it is inserted in the boss, or some other well known expedient being adopted to permit assembly of the parts as shown. The center of gravity of the composite screw 74 also lies substantially at its point of attachment to beam 65, and as in the case of extension 67 and level 70, its movement relatively to spindle 10 upon expansion will depend upon the material of the beam, and not upon that of the screw. As suggested in the figure, heads 76 and 77 may be made of substantial weight so as to materially assist in counterbalancing the opposite end of the beam.

An alternative construction for this part of the beam is shown in Fig. 12 in which a finger 78 of the same material as the beam is extended therefrom to substantially the center of a weight 79, bearing at its end against a screw 80 threaded axially in the weight, the weight being urged toward the beam by suitable resilient means 81. In both of these constructions the movement necessary for adjusting purposes is very slight, and may be neglected insofar as its changing the point of attachment of the weight to the beam is concerned, but if it is desirable to eliminate even this slight error, the construction of Fig. 13 may be used in which an adjustable finger 82 is slidable in the end of the beam, suitable mechanism such as a screw adjusted wedge 83 operating to move it in one direction against a spring or the like 84, the finger and wedge being preferably of the same material as the beam. Finger 82 extends within a suitable bore in a weight 85 and is fixed therewith at the plane of the center of gravity of the weight by means of a head 86 and screw 87. In this construction the weight will remain connected to the material of the beam at its center of gravity regardless of adjusting movement.

In machines arranged for very large and heavy work pieces it may be desirable to provide a more powerful lifting mechanism than the screw construction 23, and for this purpose a hydraulic mechanism is contemplated shown diagrammatically in Fig. 11. In this construction a column 88 is provided corresponding to above described column 2, and having an enlarged portion 89 constituting a piston guided in a cylinder bore 90 carried in a base, a portion of which is shown at 91, corresponding to base 1. Suitable packing 92 prevents leakage of fluid past piston 89, and fluid is supplied from a reservoir 93 by means of a hand pump of well known or suitable construction having a cylinder 94, piston 95, operating handle 96, valve chamber 97, suction pipe 98 and delivery pipe 99, the latter leading to cylinder 90. A valve 100 provides escape for fluid from the cylinder when it is desired to lower piston 89, the fluid being returned to reservoir 93.

The structure of Figs. 14 and 15 is adapted to avoid difficulty from flattening or denting ball 49, the ball being replaced in the present instance by a body 101, preferably partially cylindrical, but having one or both ends curved in the form of a spheroid, paraboloid, or other symmetrical convex element as shown. Member 101 is provided with an insert 102 of suitable material particularly adapted to resist damage or wear, and located to contact and rest upon above mentioned insert 50 in column 2. Any material is contemplated for these inserts which has sufficient resistance to the type of damage likely to occur at this point, suitable materials being for example tungsten carbide, tantalum carbide, "Stellite" etc., and the inserts may be maintained in place by any suitable or well known method such for example as brazing, peening the surrounding metal, or the like. A bushing 103 is used with member 101 in the same manner as bushing 51 above described, the bushing providing a snug sliding fit for the cylindrical portion of the member, and being provided with a shoulder 104 cooperating with the upper curved surface thereof in the same manner as shoulder 54.

A screw 105 similar to screw 55 above described provides a finger 106 extending through the upper part of bushing 103, and having a concave lower surface which may conveniently fit the curvature of the upper surface of member 101. A substantial bearing surface is thus obtained at this point, whereby the load may be carried without danger of deformation of either the member 101 or the finger 106.

A further modification is shown in Fig. 15 in which a second insert 102 is provided in the upper end of a modified member 107, the member being otherwise identical with member 101, the insert bearing against an insert 108 in the end of a finger 109 constituting a part of a screw similar to 55 or 105. A further modification is shown in Fig. 16 in which the upper surface of a member 110 corresponding to members 101 and 107 is made flat, a finger 111 having a flat or otherwise complementary surface bearing thereagainst to provide a substantial bearing surface between the member and the finger. Bushing 103 is identical with that shown in Fig. 14 in each case, the details of the screw, column, spindle etc. being the same as disclosed in Fig. 4. With this structure substantially absolute concentricity of the spindle 10 and the bearing points between the finger, the member 101, and column 2 is assured. This avoids the possibility of lateral displacement of these points such as would be apt to cause inaccuracy in the readings of level 4.

From the above it will be apparent that there has been provided a machine upon which similar work-pieces can be tested for correct balance with great rapidity, it being merely necessary to mount the piece on the machine, raise the column, and read both the angular location and the amount of the unbalance directly on the level 4. Also it will be apparent that the accuracy of the machine may be readily checked without extraneous instruments, this also being accomplished by means of level 4, and that the adjustment of the machine may be readily changed for work pieces of different weights or other characteristics. Furthermore, provision has been made for insuring that changes in the sensitive parts of the machine due to changes in temperature will be of equal effect on opposite sides of the fulcrum so that the balance of the beam is not disturbed by changes in temperature, and provision has been made for preventing damage to the fulcrum bearing. The above being a complete description of illustrative embodiments of the invention, what is claimed as new and desired to be secured by Letters Patent of the United States is:

1. In a balancing machine the combination of an upstanding column, a beam pivotally supported on said column for tilting movement in any direction, and arranged to support a work piece for testing, a universal level on said beam, means on said level arranged to directly indicate the direction of any tilting of said beam, and a dial on said beam arranged in proximity to said work piece for plotting upon said work piece, values read on said level.

2. In a balancing machine the combination of a beam, an upstanding column, a fulcrum bearing pivotally supporting said beam on said column, a level on said beam, and means on said level arranged to indicate the amount of any unbalance, a graduated scale on one end of said beam, and a checking weight slidably mounted on said scale to counteract any tilting caused in said beam by a work piece mounted thereon whereby to determine the moment of any unbalanced weight in said work piece, means for vertically adjusting the point of contact of said fulcrum bearing with said column relatively to said beam for coordinating the degree of tilting of said beam with the amount of such unbalanced weight whereby with said checking weight removed, the amount of said unbalanced weight may be read directly and accurately on said level.

3. In a balancing machine the combination of an upstanding column, a beam pivotally supported on said column, a level on said beam adjacent an end thereof, a graduated scale member projecting from an end of said beam, and a counterbalance weight adjustable toward and from said column and fixed with said beam at the end opposite said scale member, said beam being of substantially equal length between said column and scale member, and between said column and counterbalance weight whereby the moment of the weight of one half of the beam will equal the moment of the other half regardless of changes in length of the beam due to temperature changes.

4. In a balancing machine the combination of an upstanding column, a beam pivotally supported on said column and having a pivot including a hollow spindle surrounding said column and fixed with said beam, an adjustable abutment in said spindle, a bushing slidable in said spindle and providing a bore concentric with said spindle, a pivot ball fitting said bore and resting on said column, a finger on said abutment extending into said bushing and contacting said ball for supporting said spindle and beam from said ball and column.

5. In a balancing machine the combination of an upstanding column, a beam pivotally supported on said column and having a pivot including a hollow spindle surrounding said column, an adjustable abutment in said spindle, a bushing snugly slidable in said spindle and providing a bore concentric with said spindle, a pivot ball snugly fitting said bore, said bushing providing a reduced portion of said bore extending from said ball opposite said column, an extension finger on said abutment traversing said reduced portion of said bore and contacting said ball for supporting said spindle and beam from said ball and column, and a portion on said abutment positioned to contact and move said bushing in the event of movement of said ball independently of said bushing caused by adjustment of said abutment.

6. In a balancing machine the combination with an upstanding column, a beam pivotally supported on said column having a pivot including a hollow spindle surrounding said column and fixed with said beam, a pivot ball element in said spindle, and a universal level on said beam, of a bushing inserted between said column and said spindle for accurately aligning said spindle parallel to said column whereby said level indicates the accuracy of positioning of said column.

7. In a balancing machine the combination of a base, an upstanding column supported from said base, a beam pivotally supported on said column and having a pivot including a hollow spindle surrounding said column and fixed with said beam, a pivot ball element in said spindle, a universal level on said beam, spaced adjustable supporting elements on said base for adjusting the position of said column to obtain a true vertical position thereof, means for adjusting said level relatively to said beam, and a bushing inserted between said column and said spindle for accurately aligning said spindle parallel to said column whereby said level indicates the accuracy of adjustment of said column, and whereby said column may be used as a reference axis for testing the setting of said level relatively to said beam.

8. In a balancing machine having a base, an upstanding column supported from said base, a hollow spindle enclosing said column, a beam attached to said spindle, and a level on said beam, the combination of a plurality of adjustable members on said base for supporting said base, and arranged to be adjusted to obtain a true horizontal position of said base, a bushing formed to fit both the exterior of said column and the interior of said spindle for obtaining a true coaxial position of said column and stem, and a plurality of spaced adjusting fastening means for holding said level on said beam for obtaining a true horizontal setting of said level on said beam, whereby said level may be used to indicate the condition of level of both said base and said beam.

9. In a balancing machine the combination of a beam, an upstanding column, a fulcrum bearing pivotally supporting said beam on said column, a level on said beam, and means on said level arranged to indicate the amount of unbalance, a checking weight removably mounted on said beam of a value to counteract tilting caused in said beam by a predetermined amount of unbalance in a work piece placed on said beam, means for vertically adjusting the point of contact of said fulcrum bearing with said column relatively to said beam for coordinating the degree of tilting of said beam with the amount of such unbalanced weight, whereby with said checking weight removed, the amount of said unbalanced weight may be read directly on said level.

10. In a balancing machine, the combination of a base having an upstanding column, a beam pivotally supported on said column for tilting movement in any direction, and arranged to support a work piece for testing, a universal level on said beam, means on said level arranged to directly indicate the direction of any tilting of said beam, and a graduated shielding dial positioned to prevent accumulation of material on said base in position to interfere with said tilting movement of said beam, said dial being arranged in proximity to said work piece for plotting upon said work piece values read on said level.

11. A balancing machine having a column, a universally tiltable beam supported on the column, a universal level mounted on the end portion of said beam at a point laterally of said column, graduations on the level arranged to indicate the location and amount of unbalance in a work piece placed on the beam, means for adjusting the level on the beam for coordinating it with the axis of a work piece as mounted on the beam, and means for adjusting the column to obtain a dead level surface for the pivot of the beam.

12. A base, an upstanding column supported from the base, and having a flat top, adjusting means for obtaining a dead-level position of the flat top, a spindle surrounding the column, a convex bearing element in the spindle in position to engage said flat top, a beam fixed with the spindle, said beam and spindle being tiltable in all directions with said bearing element, a universal level mounted on the end portion of said beam at a point laterally of said column, graduations on the level arranged to indicate the location and amount of unbalance in a work piece on said spindle, means for adjusting the level on the beam for coordinating it with the axis of the work piece mounted on the spindle, and means for adjusting said bearing element up and down in said spindle for coordinating the amount of tilting of the beam with the unbalance of the work piece so that the indications of the level against the graduations correspond with the unbalance in the work piece.

JOHN LEONARD TAYLOR.